United States Patent [19]

Cazzani et al.

[11] Patent Number: 4,741,686
[45] Date of Patent: May 3, 1988

[54] EXTRUSION DIE FOR PLASTIC MATERIAL

[75] Inventors: Gilberto Cazzani, Morazzone; Luigi Macchi, Gorla Maggiore, both of Italy

[73] Assignee: Omipa Italia S.N.C. Di Cazzani Gilberto & C., Morazzone, Italy

[21] Appl. No.: 8,509
[22] PCT Filed: May 5, 1986
[86] PCT No.: PCT/EP86/00265
§ 371 Date: Jan. 12, 1987
§ 102(e) Date: Jan. 12, 1987
[87] PCT Pub. No.: WO86/06678
PCT Pub. Date: Nov. 20, 1986

[30] Foreign Application Priority Data

May 15, 1985 [IT] Italy ................ 20730 A/85

[51] Int. Cl.4 ............................................. B29C 47/16
[52] U.S. Cl. ................................. 425/381; 74/479; 425/466
[58] Field of Search ............... 425/381, 466, 141, 150; 264/176.1, 40.5; 74/89.15, 471 R, 479

[56] References Cited

U.S. PATENT DOCUMENTS

| | | | |
|---|---|---|---|
| 2,880,832 | 4/1959 | Apel | 74/471 X |
| 2,926,544 | 3/1960 | Carmichael, Jr. | 74/471 X |
| 3,195,183 | 7/1965 | Phillips | 425/466 |
| 3,427,889 | 2/1969 | Baum | 74/89.15 |
| 3,680,997 | 8/1972 | Dukert et al. | 425/381 |
| 3,940,221 | 2/1976 | Nissel | 425/381 X |
| 3,963,051 | 6/1976 | Kuhlmann | 74/479 X |
| 4,124,342 | 11/1978 | Akatsuka et al. | 425/141 |
| 4,125,350 | 11/1978 | Brown | 425/381 |
| 4,514,348 | 4/1985 | Iguchi et al. | 425/466 X |
| 4,627,786 | 12/1986 | Minematsu et al. | 74/479 X |

FOREIGN PATENT DOCUMENTS 79052  5/1983  European Pat. Off. .

Primary Examiner—Richard L. Chiesa
Attorney, Agent, or Firm—Young & Thompson

[57] ABSTRACT

An extrusion die having an extrusion slit defined by two lips one of which is flexible. A plurality of thrust members are disposed very close to one another and bear against the flexible lip. A drive motor is individual to each thrust member for rotating each thrust member to move the flexible lip toward or away from the other lip. A universal joint directly connects an output shaft of each motor to its respective thrust member. The output shafts are at oblique angles to their respective thrust members and some of the output shafts are disposed at substantial angles to others of the output shafts, whereby the motors are staggered.

5 Claims, 2 Drawing Sheets

EXTRUSION DIE FOR PLASTIC MATERIAL

FIELD OF THE INVENTION

The present invention relates to a flat or circular extrusion die fitted with lips which define an extrusion slit, at least one of said lips being flexible such that they can be moved towards or away from one another. The flexible lip is operated by a series of independent thrust members, which are placed parallel and very close to one another.

DISCUSSION OF THE PRIOR ART

Until now these thrust members have been made in the form of a series of screws, placed side by side parallel to one another and operated manually. Unfortunately this type of operation requires the continual presence of a skilled worker and is therefore very costly and unreliable in practice.

Automatic actuation has also been applied. This solution foresees a whole series of gudgeon pins acting on the flexible lip. These pins are lengthened or shortened by heating them by means of an electric heater. This type of coupling allows the thrust members to be placed very close to one another, but does not provide for timely intervention, that is, the part of the lip which is to be displaced cannot be acted on in real time. A further drawback is the fact that, since the length of the gudgeon pin varies as a function of its own temperature, this system, as well as being slow, also depends on the ambient temperature and the working temperature of the extrusion die. This leads to a high degree of imprecision or to a very complicated arrangement of circuits, if all these variables are to be taken into account.

U.S. Pat. No. 3,427,889 is also known wherein a connection between a regulating means for the flow and an operating device is described. No offset positioning of the operating devices is foreseen, so that it becomes necessary to place the devices at such a distance that they do not interfere with one another.

The U.S. Pat. No. 4,125,350 describes an adjusting screw which acts on the thickness regulating lip. The screw is fitted at one end with a gear which can be selectively engaged by two toothed pawls. The latter temporarily hold the screw fast with an operating means which is unique for all the screws. Therefore a simultaneous working working of the screws is impossible. The thickness tolerance of the finished product must thus compulsively be of some tenths of mm.

OBJECT OF THE INVENTION

Object of the present invention is thus to carry out an extrusion die fitted with a series of extremely precise adjusting devices, independent from the temperature and such that they can be operated automatically in real time, one independently from the other.

The above-said object has been achieved as specified in the enclosed claims.

BRIEF DESCRIPTION OF THE DRAWINGS

The invention will now be explained in more detail on the basis of an exemplary embodiment which is shown in the accompanying drawings, in which.

DETAILED DESCRIPTION OF THE INVENTION

Figure 1:
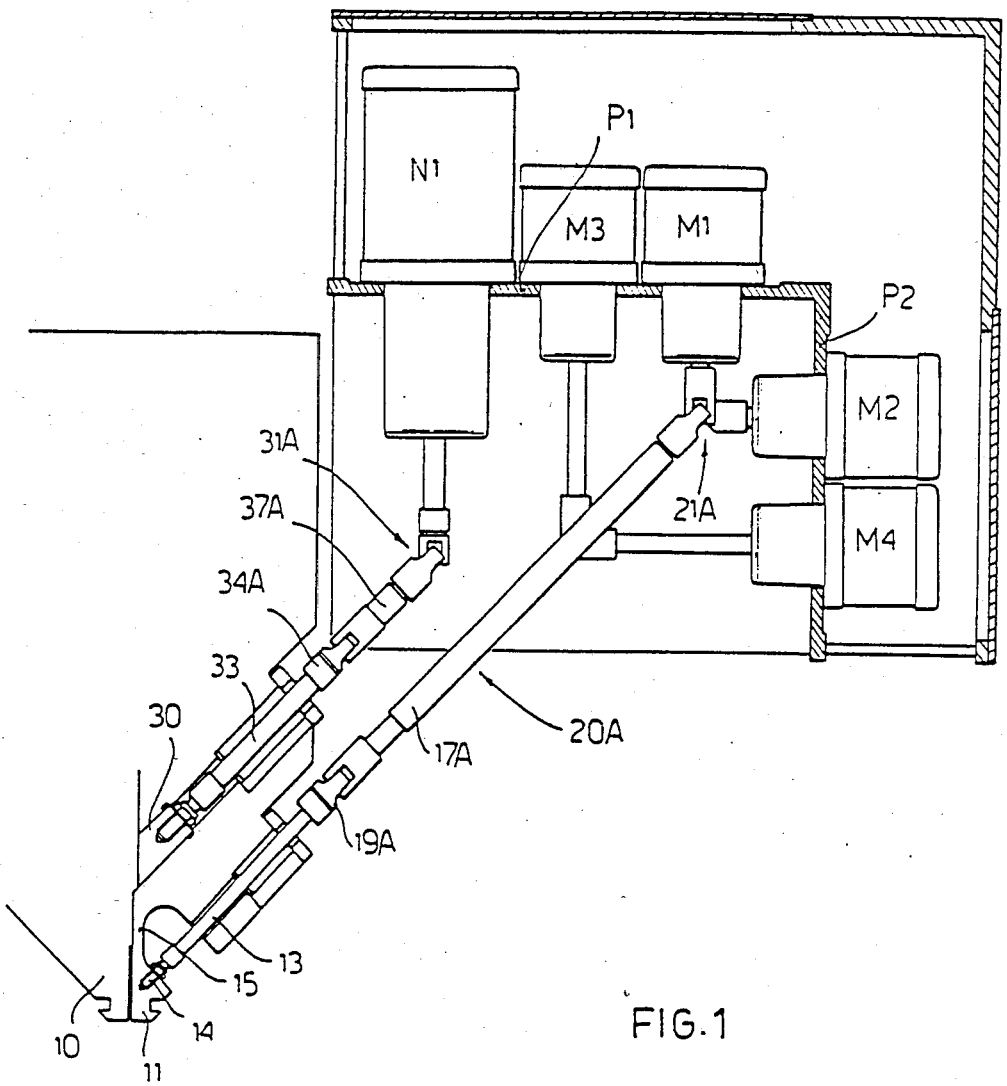
FIG. 1 is a side view partially sectioned of an extrusion die according to the invention.

Referring to the drawings, it can be seen that 10 indicates the rigid lip of the flat extrusion die. On the other hand, 11 indicates the flexible lip, which is connected to the body by means of thin portion 15, the latter flexing when acted on by a series of thrust members 13, which in the example are in the form of screws 13A, 13B, 13C, 13D. Each screw is connected to the flexible lip 11 by means of a fastening 14, which may be of any known kind. Each screw is made integral with one link 20A, 20B, 20C or 20D, which mechanically connects said screw to the respective actuating means M1, M2, M3 or M4, in this example provided in the form of a stepping motor. Each link 20A, 20B, 20C and 20D is telescopic and articulated or flexible, such that each respective actuating means M1, M2, M3 and M4 can be staggered with respect to the neighbouring means.

Figure 2:
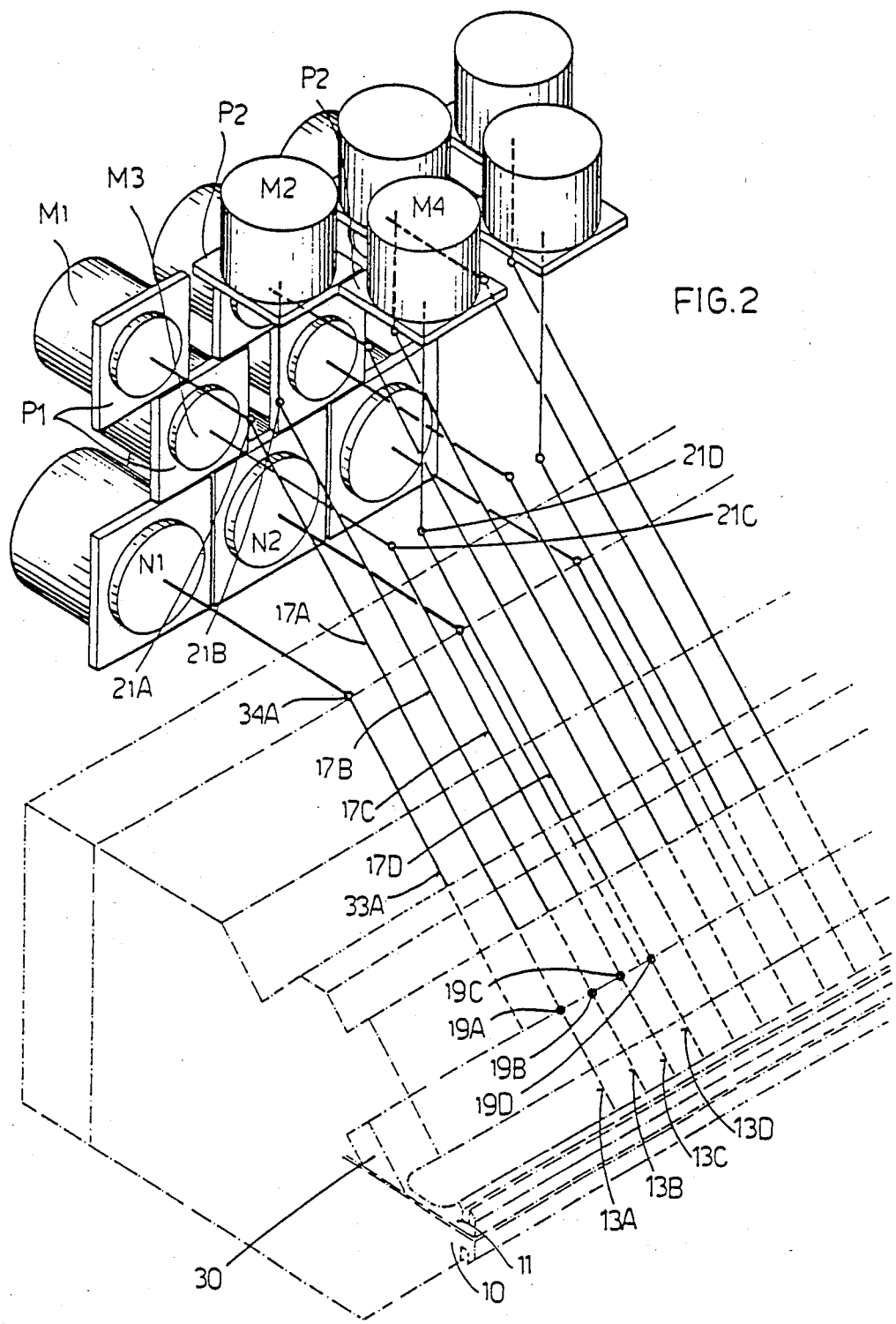
FIG. 2 is an axonometric scrap view of said die.

In particular, as can be seen in FIGS. 1 and 2, the motors are arranged on two support surfaces P1 and P2, placed at an angle to one another. Motor M1 is situated at the front on top, on surface P1, the subsequent motor M2 is lower down, on surface P2, M3 is situated on surface P1, but behind M1, and lastly M4 is on surface P2 below M2.

Links 20A, 20B, 20C and 20D consist of, for example, universal joints with relative telescopic-type connecting rods.

Some of these joints can be seen in FIG. 1. Link 20A, in particular, is made up of a telescopic rod 17A of variable length and terminating, at the end to which respective screw 13A is to be connected, in a universal joint 19A, an end of which is connected to screw 13A. The telescopic rod 17A is connected at its other end to the universal joint 21A, while the other end of the latter is connected to the stepping motor M1. Screws 13B, 13C, 13D, next to the one considered above, are connected respectively to motors M2, M3, M4 by means of joints 19B, 21B; 19C, 21C and 19D, 21D, as well as telescopic rods 17B, 17C and 17D.

If the stepping motors were larger, it would obviously be necessary to stagger them even more, which would imply the use of a set of motors greater than four, for example six. On the other hand, if the motor dimension is small, the staggering between the motors could comprise a smaller set of motors, for instance three.

In addition, provision has been made so that the extrusion slit can also be regulated upstream by means of a flexible bar 30, actuated by a screw 33 A, which is connected to a universal joint 34A, connected to a telescopic rod 37A, the latter, in turn, being connected to a universal joint 31A which allows the actuating means to be staggered, that is not aligned with the stepping motors N1 and N2, which actuate bar 30.

We claim:

1. An extrusion die having an extrusion slit defined by two lips one of which is flexible, a plurality of thrust members disposed very close to one another and bearing against said one lip, a drive motor individual to each thrust member for rotating each thrust member, means converting rotary motion of each thrust member into movement of said one lip toward or away from the other said lip, and a universal joint directly connecting an output shaft of each said motor to its respective thrust member, said output shafts being at oblique angles to their respective thrust members and some of said output shafts being disposed at substantial angles to others of said output shafts whereby said motors are staggered.

2. An extrusion die as claimed in claim 1, said thrust members being telescopic rods.

3. An extrusion die as claimed in claim 1, and a second universal joint spaced along each said thrust member at a distance from the first mentioned universal joint.

4. An extrusion die as claimed in claim 3, each thrust member between its associated universal joints being in the form of a telescopic rod.

5. An extrusion die as claimed in claim 1, and a flexible bar for regulating the flow of material to be extruded upstream of the extrusion slit, and means urging said flexible bar toward and away from said material to be extruded.

* * * * *